Patented Apr. 29, 1941

2,239,925

UNITED STATES PATENT OFFICE 2,239,925

PROCESS OF PRODUCING POROUS PLASTER AND PRODUCT THEREOF

Ralph H. McKee and Frederick A. Hessel, New York, N. Y.

No Drawing. Application August 18, 1939, Serial No. 290,796

14 Claims. (Cl. 106—24)

The present invention relates to a process of producing porous plaster and, more particularly, to a novel and improved process of producing porous gypsum plaster and to the product of such process.

Heretofore, various processes have been proposed and used for the production of porous and low gravity gypsum plaster. Thus, low gravity gypsum plaster has been made by incorporating shavings, paper pulp, and similar light materials in the plaster. Other processes, in which a froth-forming agent has been stirred into the mixture or in which glue, Irish moss, silica gel, hydrogen peroxide, or other materials to give a gel-like structure, have been proposed, have not provided a good solution of the outstanding problem and have never been used to any substantial extent. A substitute method for decreasing the weight of gypsum blocks has been to leave holes therein, but this method has provided a plaster with a weaker and non-uniform structure.

Although various other suggestions and proposals have also been made to solve the outstanding problem and to provide the art with a simple and completely satisfactory process of producing porous plaster, none of these various suggestions and proposals has, so far as we are aware, been completely satisfactory and successful when carried into practice on a practical and industrial scale.

We have discovered that the problem may be satisfactorily solved in a remarkably simple manner.

It is an object of the present invention to provide a process for the production of porous gypsum plaster in its various forms that eliminates the disadvantages and inconveniences of conventional processes.

It is another object of the present invention to provide a novel and improved process for the production of porous gypsum plaster structure which involves reacting a solid organic compound, urea, with a suitable material to cause the production of gaseous nitrogen at a slow, predetermined, and readily controlled rate.

It is also an object of the invention to provide a process of producing light-weight porous gypsum plaster bodies by admixing gypsum, urea, and solid calcium hypochlorite with suitable quantities of water, said gypsum bodies having small gas bubbles or voids uniformly distributed therein.

A further object is to provide a process which develops sufficient heat so that porous gypsum plaster may be laid during the winter season.

The invention also contemplates a light-weight, high-strength porous gypsum plaster having a large number of relatively small nitrogen bubbles distributed therein, that may be produced or poured or trowelled in any desired thickness or depth by a simple, direct, and fool-proof procedure and at a low cost, without requiring any special skill or experience.

Other and further objects and advantages of the invention will become apparent from the following description taken in conjunction with the accompanying example.

Broadly stated, according to the principles of our invention, a process for the manufacture of porous gypsum plaster is provided which involves scattering nitrogen bubbles through the gypsum plaster by reacting urea with calcium hypochlorite (bleaching powder) in the presence of a material adapted to decrease the rate of loss of nitrogen gas from the suspension. The preferred grade of urea is the granular fertilizer grade of that material carrying about 42% nitrogen, such as that commercially known as "Uremon." As the hypochlorite, either straight calcium hypochlorite (Ca(OCl)$_2$) or bleaching powder, which is a combination of chloride and hypochlorite (CaOCl$_2$), may be employed, or an alkali hypochlorite, such as, for example, sodium hypochlorite. Although, theoretically, hypobromites may be expected to provide equal or similar results, they are much too expensive to be of practical and industrial importance.

We have also found that in the production of a light-weight, strong, porous gypsum plaster it is of importance to control carefully the rate of reaction and, more particularly, to retard the evolution of nitrogen so that a slow gas formation over a 5 to 10 minute period is obtained, in contrast with the rapid and almost instantaneous gas evolution of some prior processes. As materials to slow down the evolution of nitrogen, there may be used rosins or other slightly soluble gums which can serve to coat the crystals of urea. Paraffin and stearic acid are other examples of suitable coating agents.

Somewhat similar results may be obtained by the addition of materials capable of stabilizing the small bubbles produced by the evolved nitrogen and of preventing their quick escape or their combination to form large bubbles or blisters. This can be obtained by small additions of soap bark or of powdered licorice root. Cost considered, the licorice root is the cheapest material to use. Although these materials are known to be capable of reducing the surface tension, it is not this property, but their ability to stabilize the small bubbles and to slow down their union to form large bubbles which is of decisive influence in forming a more uniform structure in the finished product. Thus, for example, using approximately the same amounts, licorice root gave a surface tension of 70 dynes, soap bark 52 dynes, Tergitol 55 dynes, and Igepon 39 dynes. We have found that the last two materials are practically useless in the gypsum plaster mixtures contemplated by the present invention whereas licorice root and soap bark provide excellent results. In other words, the lowering of surface tension is not a measure of usefulness, but the foam producing ability is, even though these two qualities are generally considered by physical chemists to be closely correlated.

Best results are obtained by coating the urea crystals with a thin layer of slightly water-soluble material, such as, for example, ordinary rosin and simultaneously using in the mix a small amount of licorice root. This coating of the urea can be accomplished, for example, by melting the rosin and stirring in the urea crystals so that practically all the rosin is used up in coating the crystals. Generally speaking, coated salts are the partial equivalent in effect of the use of a material such as licorice root or soap bark for stabilizing the bubbles formed.

The preferred process in general consists in adding to the calcined gypsum mixture a preferred amount of the solid urea, the licorice root or other material for retarding the evolution of gas, and the hypochlorite, and thereafter the water is added. This order of addition is convenient but not essential. The whole mixture is mixed in a conventional mixer and is poured into the forms in the conventional manner for blocks, or spread on paper for gypsum wallboard, etc.

The resultant product is a porous gypsum structure of a density lower than that which would have resulted if our active agents had not been added.

In place of urea, $CO(NH_2)_2$, derivatives of urea such as iminourea, $NH:C(NH_2)_2$ (sometimes known as guanidine), or its cyanogen derivative dicyanodiamide, $NH:C(NH_2)NHCN$, may be used as equivalents. These two derivatives of urea, though containing more nitrogen per molecule than does urea itself, in use actually evolve, mol for mol, only substantially the same amount of nitrogen gas. Accordingly, when used in our process, the amount taken will have to be increased in proportion to their molecular weights. In the appended claims the term "urea" is to be understood to include such urea derivatives as well as urea itself.

For the purpose of giving those skilled in the art a better understanding of the invention, the following illustrative examples are given:

*Example No. I*

About 200 parts calcined gypsum, about 0.30 part urea ("Uremon"), and about 1.4 parts bleaching powder are mixed, and then about 150 parts of water are mixed in. The whole is poured to give the form of structure desired. This produces a gypsum structure of about two-thirds the density of the ordinary gypsum structure, which is normally about 75 lbs. per cubic foot.

In the example just given, the temperature rise is about 30° F. This higher temperature rise brings about faster setting of the plaster but permits it to be laid in colder weather than would otherwise be the case. If desired the rate of setting may be slowed down by adding a "retarder."

*Example No. II*

The method employed is the same as in Example No. I, except that the proportions of gas-forming constituents are higher. About 145 parts calcined gypsum, about 0.56 part urea, about 2.6 parts bleaching powder and about 0.02 part powdered licorice root are mixed with about 125 parts water. A light weight gypsum product is produced, having a density of about half of a similar structure of ordinary gypsum.

By adding fibrous materials, such as shavings or wood fibers to the gypsum mixture, including the gas-forming constituents described in the foregoing, porous blocks, slabs, or boards may be produced. These porous bodies can be sawn and worked with conventional tools, are light and strong, and have excellent heat-insulating properties. Other types of aggregate, such as sand or whiting, may also be added but the resulting products are not so easily worked with ordinary tools though otherwise satisfactory.

Although the present invention has been described in connection with preferred embodiments thereof, variations and modifications may be resorted to by those skilled in the art without departing from the principles of the present invention. We consider all of these variations and modifications as within the true spirit and scope of the present invention as disclosed in the foregoing description and defined in the appended claims.

We claim:
1. The process of producing light-weight, porous plaster which comprises reacting in a plaster mix urea with a hypochlorite.
2. The process of producing light-weight, porous gypsum plaster which comprises reacting in a plaster mix urea with a hypochlorite in the presence of a material adapted to slow down the liberation of gas produced by the reaction to cause the production of fine bubbles of nitrogen-containing gas throughout said mix.
3. The process of producing light-weight porous gypsum plaster which comprises reacting urea with a hypochlorite in a plaster slurry to cause the production of nitrogen-containing bubbles in said slurry, controlling the speed of such reaction to decrease the rate of loss of nitrogen-containing gas from said slurry, and allowing said slurry to set and to harden to obtain a light-weight porous gypsum plaster of good strength.
4. The process of producing light-weight porous gypsum plaster which comprises reacting urea in a slurry of gypsum and sand with a hypochlorite selected from the group consisting of calcium hypochlorite, bleaching powder, and sodium hypochlorite.
5. The process of producing light-weight porous gypsum plaster which comprises reacting urea in a gypsum slurry with a hypochlorite selected from the group consisting of calcium hypochlorite, bleaching powder, and sodium hypochlorite in the presence of a material adapted to decrease the rate of loss of nitrogen-containing gas from said slurry, and allowing said slurry to set and to harden to obtain a light-weight porous gypsum plaster of good strength.
6. The process of producing light-weight porous gypsum plaster which comprises reacting urea in a slurry of gypsum and sand with a hypochlorite selected from the group consisting of calcium hypochlorite, bleaching powder, and sodium hypochlorite in the presence of foam-producing materials adapted to retard the loss of nitrogen-containing gas produced by said reaction, said materials being selected from the group consisting of soap bark and powdered licorice root, and allowing said slurry to set and to harden to obtain a light-weight porous gypsum plaster of good strength.

7. The process of producing light-weight porous gypsum plaster which comprises reacting urea in a slurry of gypsum and aggregate with a hypochlorite to cause the production of finely distributed nitrogen-containing bubbles in said slurry, said urea having crystals coated with a material selected from the group consisting of rosin, slightly soluble gums, paraffin and stearic acid to slow down the production of nitrogen-containing gas, and subsequently allowing said slurry to set and to harden to obtain a light-weight plaster of good strength.

8. The process of producing light-weight porous gypsum plaster which comprises reacting urea with bleaching powder in the presence of ground licorice root in a slurry of gypsum and aggregate to cause the production of finely distributed nitrogen-containing bubbles at a relatively slow and controlled rate, and allowing said slurry to set and to harden to obtain a light-weight porous gypsum plaster of good strength.

9. The process of producing light-weight porous gypsum plaster which comprises reacting about 0.3 part by weight of granular urea carrying approximately 42% nitrogen with about 1.4 parts by weight of 35% bleaching powder in a slurry of aggregate and about 200 parts of calcined gypsum in the presence of a small but effective amount of ground licorice root to cause the production of finely distributed nitrogen-containing bubbles at a relatively slow and controlled rate, and allowing said slurry to set and to harden to obtain light-weight porous plaster of good strength.

10. The process of producing light-weight porous gypsum plaster which comprises reacting about 0.3 part by weight of granular urea carrying approximately 42% nitrogen with about 1.4 parts by weight of 35% bleaching powder in a slurry of aggregate and about 200 parts of calcined gypsum to cause the production of finely distributed nitrogen bubbles at a relatively slow and controlled rate, and allowing said slurry to set and to harden to obtain light-weight porous plaster of good strength.

11. The process of producing light-weight porous gypsum plaster which comprises reacting about 0.3 part by weight of granular urea carrying approximately 42% nitrogen with about 1.4 parts by weight of 35% bleaching powder in a slurry of aggregate and about 200 parts of calcined gypsum in the presence of about 150 parts by weight of water to cause the production of finely distributed nitrogen bubbles at a relatively slow and controlled rate, and allowing said slurry to set and to harden to obtain light-weight porous gypsum plaster of good strength.

12. The process of producing light-weight porous gypsum plaster which comprises reacting about 0.56 part by weight of granular urea carrying approximately 42% nitrogen with about 2.6 parts by weight of 35% bleaching powder in a slurry of aggregate and about 145 parts of calcined gypsum in the presence of about 125 parts of water and about 0.02 part by weight of powdered licorice root to cause the production of finely distributed nitrogen-containing bubbles at a relatively slow and controlled rate, and allowing said slurry to set and to harden to obtain light-weight porous gypsum plaster of good strength.

13. The process of producing light-weight porous gypsum plaster which comprises admixing urea and a material adapted to retard the evolution of gas therefrom to a gypsum and aggregate mixture, adding hypochlorite and then water to such mixture to cause the evolution of nitrogen bubbles at a slow and controlled rate, thoroughly mixing the resulting slurry, pouring the slurry thus treated into molds, and allowing said slurry to set and to harden in said molds to obtain a light-weight porous gypsum plaster of good strength.

14. The process of producing light-weight porous gypsum plaster which comprises admixing urea in a gypsum and aggregate mixture, said urea having crystals coated with a thin layer of a slightly water soluble material, adding water and hypochlorite to said mixture to cause the evolution of nitrogen bubbles at a slow and controlled rate, thoroughly mixing the resulting slurry for a period not exceeding fifteen minutes, pouring the slurry thus treated into molds, and allowing said slurry to set and to harden in said molds to obtain a light-weight porous gypsum plaster of good strength.

RALPH H. McKEE.
FREDERICK A. HESSEL.